(12) United States Patent
Petroskie et al.

(10) Patent No.: US 7,877,891 B2
(45) Date of Patent: Feb. 1, 2011

(54) ROTOR CLOCKING BAR AND METHOD OF USE

(75) Inventors: Robert Michael Petroskie, Roebuck, SC (US); Creston Lewis Dempsey, Mauldin, SC (US); Roberto Anthony Nunez, Greenville, SC (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 12/209,228

(22) Filed: Sep. 12, 2008

(65) Prior Publication Data

US 2010/0064802 A1  Mar. 18, 2010

(51) Int. Cl.
    *G01D 21/00* (2006.01)
(52) U.S. Cl. .......................................... 33/613; 33/645
(58) Field of Classification Search ................... 33/613, 33/645
    See application file for complete search history.

(56) References Cited

U.S. PATENT DOCUMENTS

| | | | |
|---|---|---|---|
| 2,567,586 A * | 9/1951 | Werder .......................... | 33/562 |
| 3,996,670 A | 12/1976 | Joyal et al. | |
| 4,056,888 A | 11/1977 | Hughey, Jr. | |
| 4,146,967 A | 4/1979 | Rohner et al. | |
| 4,395,827 A | 8/1983 | Stowe et al. | |
| 4,411,073 A | 10/1983 | Ryan | |
| 4,428,126 A * | 1/1984 | Banks .......................... | 33/645 |
| 4,642,901 A | 2/1987 | Webb | |
| 5,031,335 A | 7/1991 | Kimmelman | |
| 5,152,070 A | 10/1992 | Sorokes | |
| 5,152,071 A | 10/1992 | Bergeron | |
| 5,628,119 A * | 5/1997 | Bingham et al. ............... | 33/613 |
| 5,993,160 A | 11/1999 | Bouchard et al. | |
| 6,381,908 B1 * | 5/2002 | Fisher .......................... | 33/613 |
| 6,457,913 B1 * | 10/2002 | Garten ......................... | 33/613 |
| 6,860,028 B2 * | 3/2005 | Charest et al. ................. | 33/645 |
| 6,886,267 B1 * | 5/2005 | Karwowski et al. ............ | 33/613 |
| 6,895,684 B1 * | 5/2005 | Firth ........................... | 33/613 |
| 6,935,041 B2 * | 8/2005 | Orton .......................... | 33/613 |
| 7,152,338 B2 * | 12/2006 | Thompson et al. ............. | 33/613 |
| 7,185,875 B1 * | 3/2007 | Jarrett .......................... | 33/613 |
| 7,571,551 B1 * | 8/2009 | Anderson ..................... | 33/613 |
| 2009/0223073 A1 | 9/2009 | Tu | |

* cited by examiner

*Primary Examiner*—Yaritza Guadalupe-McCall
(74) *Attorney, Agent, or Firm*—Cantor Colburn LLP

(57) ABSTRACT

A clocking bar includes a rod and an indicator located along a length of the rod, wherein the indicator has a pair of indication components with a predetermined spacing therebetween. The bar also includes a hole one locator located along the length of the rod, and a rear hole locator located along the length of the rod. The clocking bar is configured to identify a stack bolt hole one from among a plurality of bolt holes on a rotor through use of a relationship between physical features of the rotor.

18 Claims, 4 Drawing Sheets

ROTOR CLOCKING BAR AND METHOD OF USE

BACKGROUND OF THE INVENTION

The subject matter disclosed herein relates to gas turbine engines and, more particularly, to a tooling device in the form of a clocking bar that facilitates the identification of the stack bolt hole one on an unclocked rotor wheel.

Clocking of blades on rotating rotors or wheels is common in gas turbine engines, especially on modern rotors. Clocking generally refers to the relative positioning of two rows of blades or airfoils with respect to each other, wherein such blade positioning can affect the efficiency of the gas turbine. However, some rotors have blades that are not clocked, for example, those on older compressor rotors or wheels. As such, these unclocked rotors have an unknown or random relationship between the bolt hole pattern in the rotor and the dovetail slots formed in the rotor to accommodate the blades or airfoils. Typically the number of dovetail slots is not evenly divisible by the number of bolt holes. Thus, the distance from each bolt hole to the nearest dovetail slot differs between bolt holes and dovetails. Such randomly clocked wheels sometimes result in unfavorable aerodynamic consequences that may lead to component damage within the engine.

BRIEF DESCRIPTION OF THE INVENTION

According to one aspect of the invention, a clocking bar includes a rod; an indicator located along a length of the rod, wherein the indicator has a pair of indication components with a predetermined spacing therebetween; a hole one locator located along the length of the rod; and a rear hole locator located along the length of the rod, wherein the clocking bar is configured to identify a stack bolt hole one from among a plurality of bolt holes on a rotor through use of a relationship between physical features of the rotor.

According to another aspect of the invention, a method for identifying a stack bolt hole one from among a plurality of bolt holes on an unclocked rotor includes placing a clocking bar on a forward face of the unclocked rotor such that a hole one locator that is part of the clocking bar is within one of the plurality of bolt holes, and inspecting an indicator portion of the clocking bar to determine if the bolt hole that the hole one locator is within is the stack bolt hole one on the unclocked rotor, wherein the bolt hole that the hole one locator is within is the stack bolt hole one of the unclocked rotor when the indicator portion of the clocking bar indicates that a particular relationship between physical features of the unclocked rotor has occurred.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
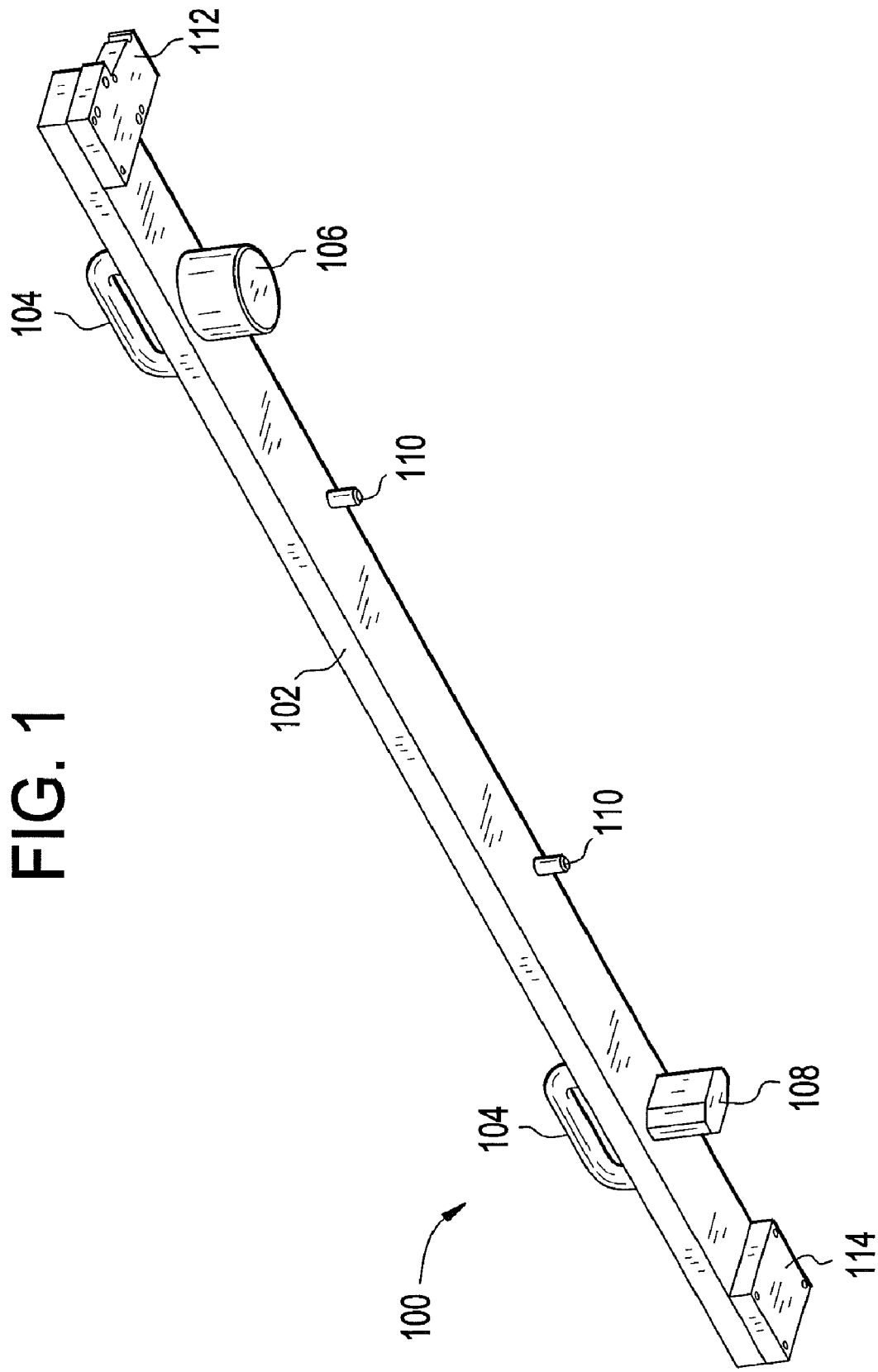
FIG. 1 is a perspective view of a clocking bar according to an aspect of the invention.

Referring to FIG. 1, an embodiment of a tooling device in the form of a clocking bar 100 in accordance with an aspect of the invention includes a rod 102 that may be generally rectangular in shape or other suitable shapes. The rod 102, which may comprise aluminum or other suitable material, may have at least one handle, here a pair of handles 104, formed from plastic or other suitable material located on one side (e.g., a top or upper side) of the rod 102. Located on an opposite side (e.g., a lower or bottom side) of the rod 102 is a hole one locator 106 which may be generally cylindrical in shape (to match the corresponding cylindrical holes in the rotor as described and illustrated hereinafter) and may also be made of aluminum or other suitable material. Also located on the bottom side of the rod 102 is a rear hole locator 108, which may comprise an octagon-shaped post made from aluminum or other suitable material. The hole one locator 106 and the rear hole locator 108 may each be spaced equidistantly from the center of the rod 102. A pair of pins 110, in the form of, e.g., dowels and formed from, e.g., steel, may be spaced equidistantly apart and are located on the bottom side of the rod 102 so as to protrude downward therefrom. At one end of the rod 102 is located an indicator 112, which is illustrated in more detail in FIG. 4 and which is also located on the underside of the rod 102. As described in more detail hereinafter, the indicator 112 is utilized to provide a visual indication of whether the clocking bar 100 has located the stack bolt hole one on an unclocked rotor. A stand-off pad 114 is located on the bottom side of the rod 102 and at the other end of the rod 102 opposite the indicator 112.

Figure 2:
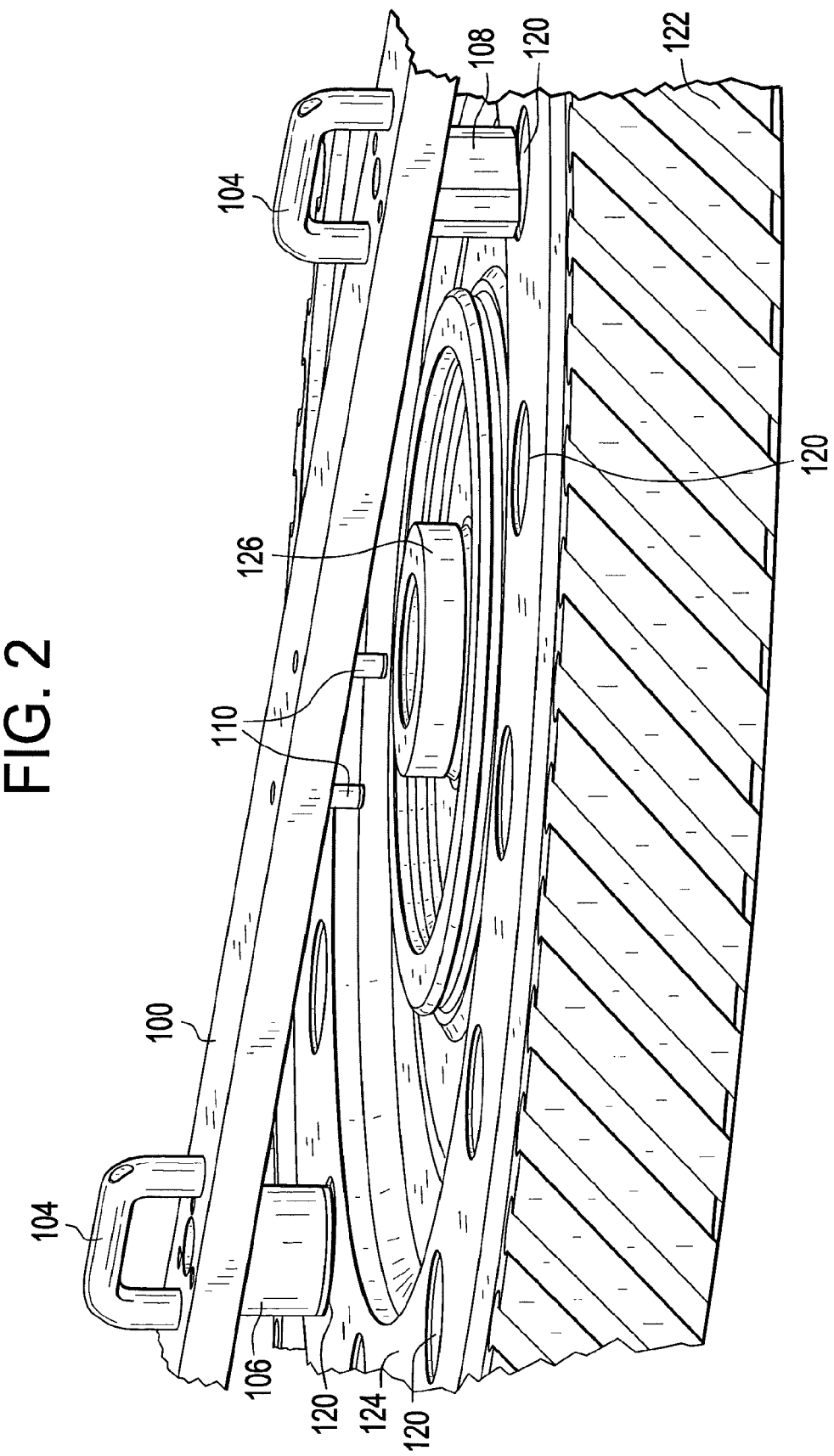
FIG. 2 is a perspective view of the clocking bar of FIG. 1 in the process of being inserted within a pair of bolt holes on a front face of a unclocked rotor used within a gas turbine engine.
Figure 3:
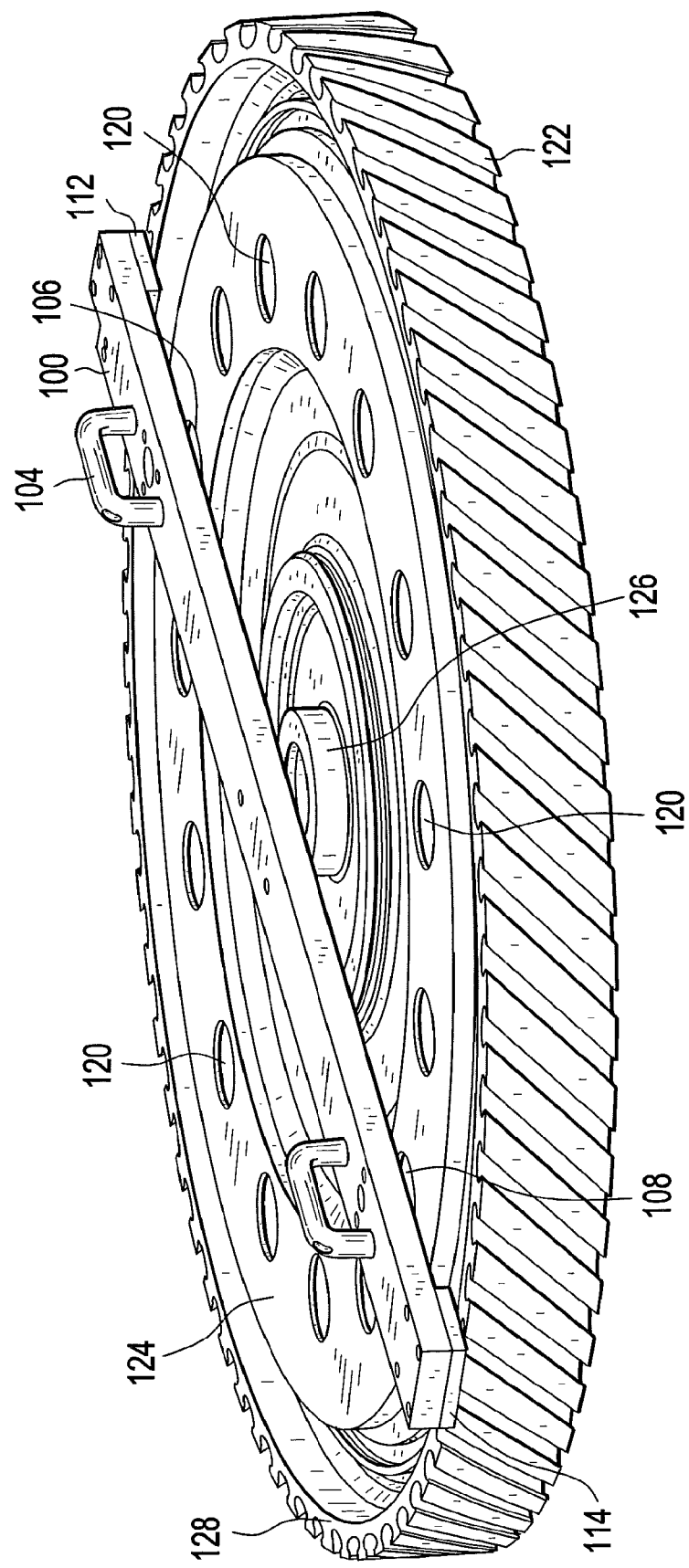
FIG. 3 is a perspective view of the clocking bar of FIG. 1 inserted within the pair of bolt holes on the front face of the unclocked rotor.

Referring to FIG. 2, there illustrated is a portion of the rod 102 having the hole one locator 106 and the rear hole locator 108 in the process of each being inserted into a corresponding bolt hole 120 on a rotor or wheel 122 of, e.g., a compressor of a gas turbine engine. The illustrated rotor 122 may comprise one stage of a plurality of stages within the compressor. The rotor 122 may have a plurality (e.g., 15) of such bolt holes 120 spaced apart, e.g., equidistantly, on a front surface 124 of the rotor 122. The hole one locator 106 is placed within one of the bolt holes 120 and the rear hole locator 108 is placed within another one of the bolt holes 120 that is located on the rotor front surface 124. The bolt hole 120 that the rear hole locator 108 is placed within is approximately 168 degrees opposite the bolt hole 120 that the hole one locator 106 is placed within. The bolt holes that the hole one locator 106 and, thus, the rear hole locator 108 are placed within may be selected at random by the user of the clocking bar 100. If the clocking bar 100 is placed incorrectly on the rotor 122 (e.g., not in proper alignment with a pair of bolt holes 120), the dowel pins 110 will physically contact a boss 126 on the rotor 122, thereby indicating to the user of the bar 100 an incorrect placement thereof. Otherwise, if the clocking bar 100 is placed correctly on the rotor 122, the dowel pins 110 contact no part of the rotor 122 and both the indicator 112 and the stand-off pad 114 rest on a surface 128 of the outer periphery of the rotor 122. FIG. 3 illustrates the clocking bar 100 correctly placed on the rotor 122.

Figure 4:
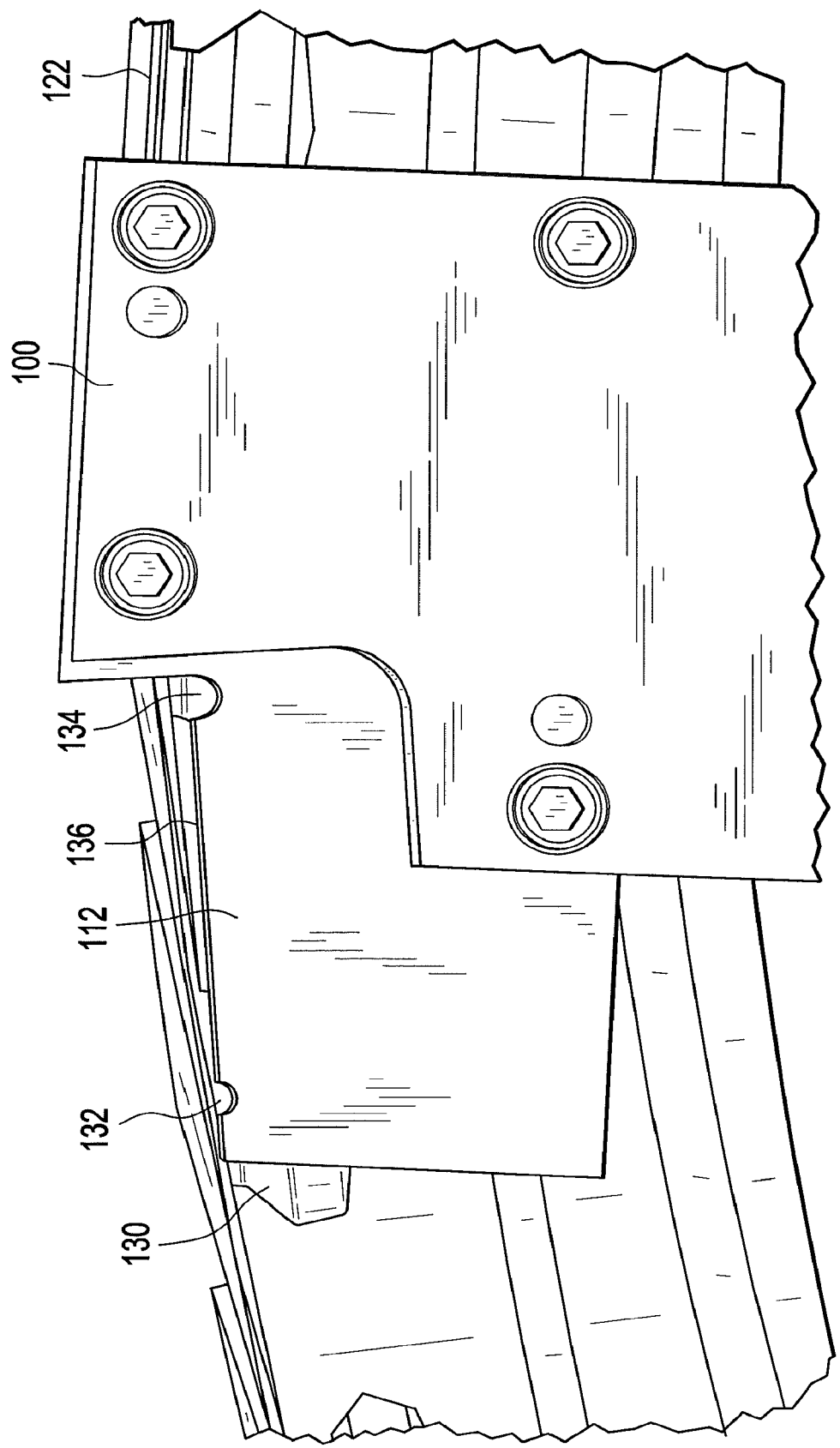
FIG. 4 is a front view of an indicator portion of the clocking bar of FIG. 1 illustrating a relationship between a dovetail slot of the rotor and a centerline of the rotor.

Referring to FIG. 4, there illustrated in greater detail is the clocking bar 100 placed on the rotor 122 with the indicator 112 lined up with both one of the dovetail slots 130 of the rotor 122 and the centerline created between the center of the rotor 122 and the center of the bolt hole 120 being checked to see if it comprises the stack bolt hole one. A pair of depressions 132, 134 in the shape of semi-circular cutouts is formed along an edge 136 of the indicator 112. The depression 134 is in the form of a relief cut and has a vertical surface ("Surface X") rising upwards in FIG. 4 from a right hand edge of the relief cut 134. The distance between the depression 132 and Surface X is at a predetermined spacing therebetween depending primarily upon the particular stage of the, e.g., compressor, that the clocking bar 100 is intended for use with. It is envisioned that different sized stages will require different sized clocking bars 100, including indicators 112 with different spacings between the depression 132 and Surface X in order to properly identify the stack bolt hole one on an unclocked rotor.

In accordance with an embodiment of the invention, the user of the clocking bar 100 performs a visual inspection of the indicator 112 to determine if the bolt hole 120 that the hole one locator 106 is located within comprises the stack bolt hole one of the unclocked rotor 122. The stack bolt hole one of the unclocked rotor 122 is identified when the leading edge of a dovetail slot 130 lies within the depression 132 on the indicator 112.

If the stack bolt hole one is not identified with the then-current position of the clocking bar 100 on the rotor 122, the clocking bar 100 is moved to locate the hole one locator 106 within another bolt hole 120 on the rotor and the visual inspection of the indicator 112 of the clocking bar 100 is again performed. This process of placing the clocking bar 100 in different bolt holes 120 is repeated until the stack bolt hole one on the rotor 122 is located. Typically, since the leading edge of a dovetail slot lies within one of the depressions 132 for only one bolt hole 120 on the rotor 122, only one of the plurality of bolt holes 120 on the rotor 122 can be the stack bolt hole one.

The clocking bar 100 of embodiments of the invention allows for manufacturing and repair shops to quickly determine, using a relatively low cost tooling device, the stack bolt hole one on rotors or wheels that have an unknown bolt hole to dovetail slot relationship. This allows an unclocked or randomly broached rotor to be provided with clocked blades. The clocking bar thus eliminates relatively longer and more costly metrology work that normally would be required to identify the stack bolt hole one on an unclocked rotor. Also, by allowing a previously unclocked rotor to become clocked, the cost of having to replace the entire unclocked rotor with a clocked rotor is eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A clocking bar, comprising:
   a rod;
   an indicator located along a length of the rod, wherein the indicator includes a pair of indication components with a predetermined spacing therebetween;
   a hole one locator located along the length of the rod; and
   a rear hole locator located along the length of the rod, wherein the clocking bar is configured to identify a stack bolt hole one from among a plurality of bolt holes on a rotor through use of a relationship between physical features of the rotor and to identify a corresponding leading edge of a dovetail slot on the rotor, wherein the relationship is indicated by the pair of indication components when the hole one locator is located within one of the plurality of bolt holes and the rear hole locator is located within another one of the plurality of bolt holes.

2. The clocking bar of claim 1, wherein the indicator is located at one end of the rod.

3. The clocking bar of claim 1, wherein a first one of the indication components comprises a depression and a second one of the indication components comprises a surface.

4. The clocking bar of claim 1, wherein the rear hole locator is located along the length of the rod opposite the hole one locator on the other side of a center point of the rod.

5. The clocking bar of claim 1, further comprising a pair of pins located along the length of the rod on either side of a center point of the rod.

6. The clocking bar of claim 5, where the pins comprise dowel pins.

7. The clocking bar of claim 1, further comprising a stand-off pad located on an end of the rod.

8. The clocking bar of claim 1, further comprising at least one handle attached to the rod.

9. A method for identifying a stack bolt hole one from among a plurality of bolt holes on an unclocked rotor, the method comprising:
   placing a clocking bar on a forward face of the unclocked rotor such that a hole one locator that is part of the clocking bar is within one of the plurality of bolt holes; and
   inspecting an indicator portion of the clocking bar to determine if the bolt hole that the hole one locator is within is the stack bolt hole one on the unclocked rotor, wherein the bolt hole that the hole one locator is within is the stack bolt hole one of the unclocked rotor when the indicator portion of the clocking bar indicates that a particular relationship between physical features of the unclocked rotor has occurred.

10. The method of claim 9, wherein the particular relationship between physical features of the unclocked rotor comprises when a leading edge of a dovetail slot of the unclocked rotor lies within an indication component of the indicator portion of the clocking bar and when a center line of the unclocked rotor lies within a surface of the indicator portion of the clocking bar.

11. The method of claim 9, wherein the clocking bar further includes a rear hole locator that is within another one of the plurality of bolt holes of the unclocked rotor when the hole one locator is within the one of the plurality of bolt holes.

12. The method of claim 9, wherein if the stack bolt hole one of the unclocked rotor is not determined with a then-current placement of the clocking bar on the forward face of the unclocked rotor, the method further comprising:

placing the clocking bar on the forward face of the unclocked rotor such that the hole one locator is within another one of the plurality of bolt holes of the unclocked rotor;

inspecting the indicator portion of the clocking bar to determine if the bolt hole that the hole one locator is within is the stack bolt hole one on the unclocked rotor, wherein the bolt hole that the hole one locator is within is the stack bolt hole one of the unclocked rotor when the indicator portion of the clocking bar indicates that the particular relationship between physical features of the unclocked rotor has occurred; and repeating the placing and the inspecting steps until the stack bolt hole one of the unclocked rotor is determined.

13. A clocking bar for identifying a stack bolt hole one on an unclocked rotor used within a gas turbine engine, the clocking bar comprising:

a rod;

an indicator located at one end of the rod, wherein the indicator includes a pair of indication components with a predetermined spacing therebetween;

a hole one locator located along the length of the rod; and a rear hole locator located along the length of the rod, wherein the clocking bar is configured to identify a stack bolt hole one from among a plurality of bolt holes on a rotor through use of a relationship between physical features of the rotor, wherein the relationship is indicated by the pair of indication components when the hole one locator is located within one of the plurality of bolt holes and the rear hole locator is located within another one of the plurality of bolt holes, and wherein the relationship between the physical features of the unclocked rotor comprises when a leading edge of a dovetail slot of the unclocked rotor lies within one of a pair of indication components and a center line of the unclocked rotor lies within the other one of the pair of indication components.

14. The clocking bar of claim 13, wherein a first one of the indication components comprises a depression and a second one of the indication components comprises a surface.

15. The clocking bar of claim 13, further comprising a pair of pins located along the length of the rod on either side of a center point of the rod.

16. The clocking bar of claim 15, where the pins comprise dowel pins.

17. The clocking bar of claim 13, further comprising a stand-off pad located on an end of the rod.

18. The clocking bar of claim 13, further comprising at least one handle attached to the rod.

* * * * *